United States Patent Office 3,350,643
Patented Oct. 31, 1967

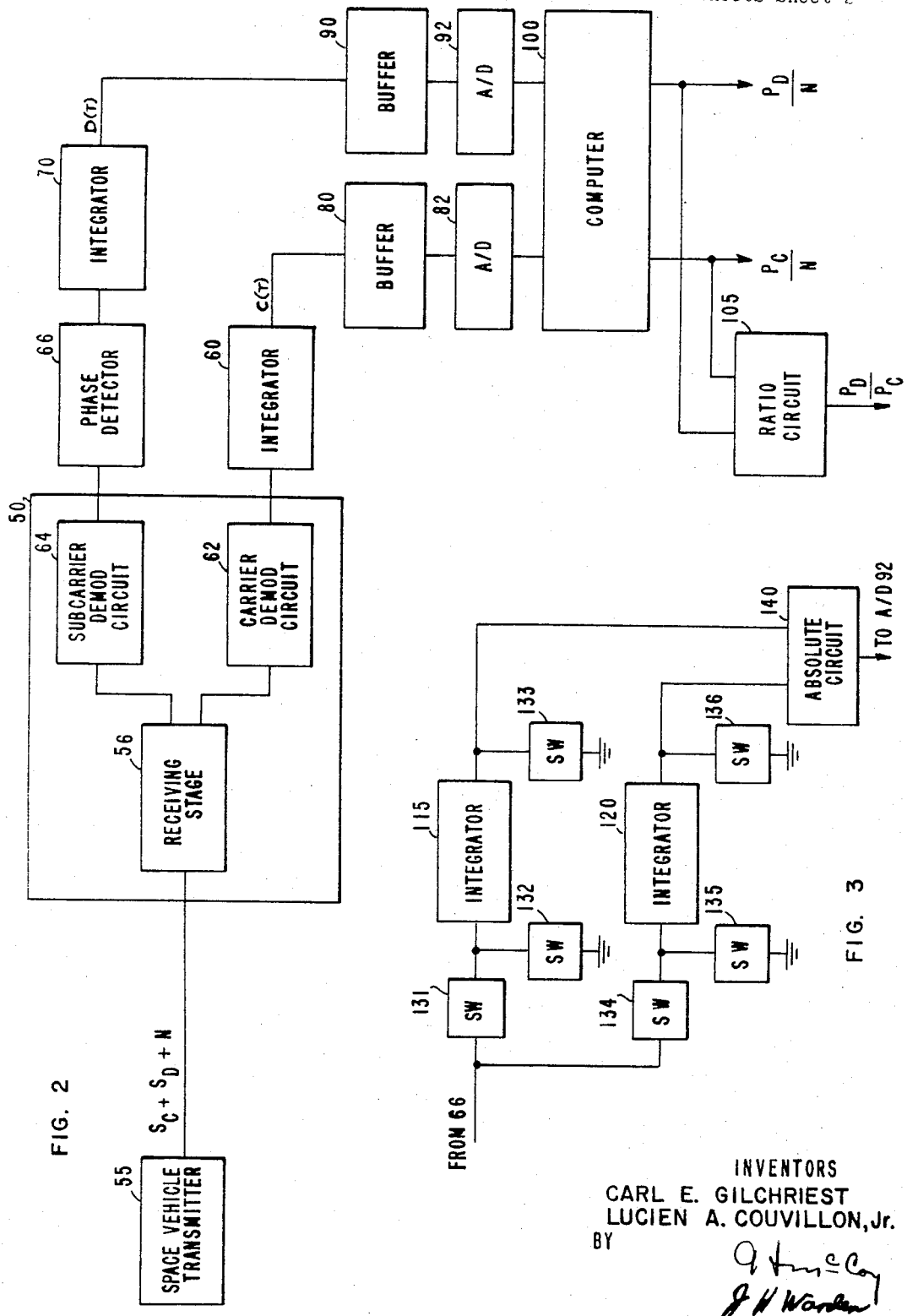

3,350,643
SIGNAL-TO-NOISE RATIO ESTIMATING BY TAKING RATIO OF MEAN AND STANDARD DEVIATION OF INTEGRATED SIGNAL SAMPLES
James E. Webb, Administrator of the National Aeronautics and Space Administration, with respect to an invention of Carl E. Gilchriest, Sierra Madre, and Lucien A. Couvillon, Jr., Los Angeles, Calif.
Filed July 15, 1965, Ser. No. 472,372
13 Claims. (Cl. 325—31)

This invention relates to signal communication circuitry and, more particularly, to a system for automatically estimating signal-to-noise ratio and other parameters in a signal communication system.

Elaborate and complex communication systems have been developed in order to automatically communicate with space vehicles engaged in space exploration. Basically, scientific data gathered in a space vehicle from various sensing devices is transmitted to earth, where the data is received by a highly complex receiving system. Often the data is received at different locations all over the globe and then transferred to a central location by means of Teletype lines. Since the transmitter in the vehicle is of limited power and with the extremely long distance between the vehicle and the earth, the received data is of extremely low level or power which must be amplified many fold before the data can be meaningfully interpreted. The interpretation problem is complicated by extraneous noise which is superimposed on these low level signals so that there is an ever-present danger that the data may be erroneously interpreted, thereby defeating the main objective of the vehicle's mission, which is to gather accurate information on various phenomena in space.

As is appreciated by those familiar with the art of communication, noise signals from extraneous noise sources are present in practically every communication system. As the system increases in complexity, the number of potential noise sources increases. Also, in a complex system, the number of phases or portions of the system which may fail to operate properly, increases. Any such failure may result in a degraded quality of the received data which further increases the danger that the data may be erroneously interpreted. The danger of erroneous interpretation can be greatly minimized by monitoring the received signals and estimating the signal-to-noise ratio. By observing the estimated value of the signal-to-noise ratio and any changes therein, various performance parameters can be automatically produced. From the signal-to-noise ratio and the various parameters, the performance of the communication system as a whole, as well as different portions thereof, can be evaluated so that any malfunction can be speedily corrected and/or accounted for in the data interpretation. Since in space exploration, the data received from the vehicle is practically continuous, a need exists for a system which automatically and continuously estimates signal-to-noise ratio from which the performance of the communication system can be evaluated and adjusted when necessary in order to minimize the possibility of erroneous data interpretation.

Accordingly, it is an object of the present invention to provide a novel signal-to-noise ratio estimating system.

Another object is the provision of a new and relatively simple system for estimating the signal-to-noise ratio in a signal communication system.

Still another object is to provide a system for continuously monitoring signals received in a communication system and estimating the signal-to-noise ratio from which the performance of various phases of the communication system may be evaluated.

A further object is the provision of a signal-to-noise ratio estimating system to be incorporated in presently known space communication systems with a minimum of additional equipment. The system continuously monitors signals received from a space vehicle and estimates the signal-to-noise ratio from which the operation of the communication system and the various phases thereof may be evaluated.

Still a further object is to provide a system wherein the ratios of various signals to noise are automatically estimated. The ratios are then used to automatically derive various performance parameters.

Yet a further object is to provide a signal related to the modulation index in a communication system by utilizing the noise signals therein as a reference signal.

These and other objects of the invention are achieved by providing a system wherein signals from a transmitting source, such as a space vehicle, with noise signals superposed thereon, are continuously monitored. During each of a successive series of time intervals or periods, the signals plus noise are integrated to produce an output at the end of each period. These outputs are then accumulated to estimate the mean and the standard deviation of the outputs which are related to the signal-to-noise ratio by a relationship hereafter defined in detail.

Estimators for the mean and particularly the standard deviation are chosen so that the two statistical terms can be derived with a minimum of computations which are all automatically performed by either a special purpose computer or a general purpose computer, properly programmed. The mean and standard deviation are derived by accumulating a minimum number of outputs sufficient to estimate the signal-to-noise ratio with a predetermined accuracy. By using the mean and standard deviation to estimate the signal-to-noise ratio and by selecting the particular estimators to be described hereafter, the desired ratio is conveniently derived with a minimum of additional equipment and faster than if some other theoretical signal-to-noise estimation technique had been employed. In systems where the ratios of different signals to noise are derived, these ratios may automatically be operated upon to produce different performance parameters from which the system's actual performance can be assessed.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 2 is a block diagram of another embodiment of the invention; and

FIGURE 3 is a diagram of an embodiment of a portion of the circuitry shown in FIGURE 2.

Figure 1:
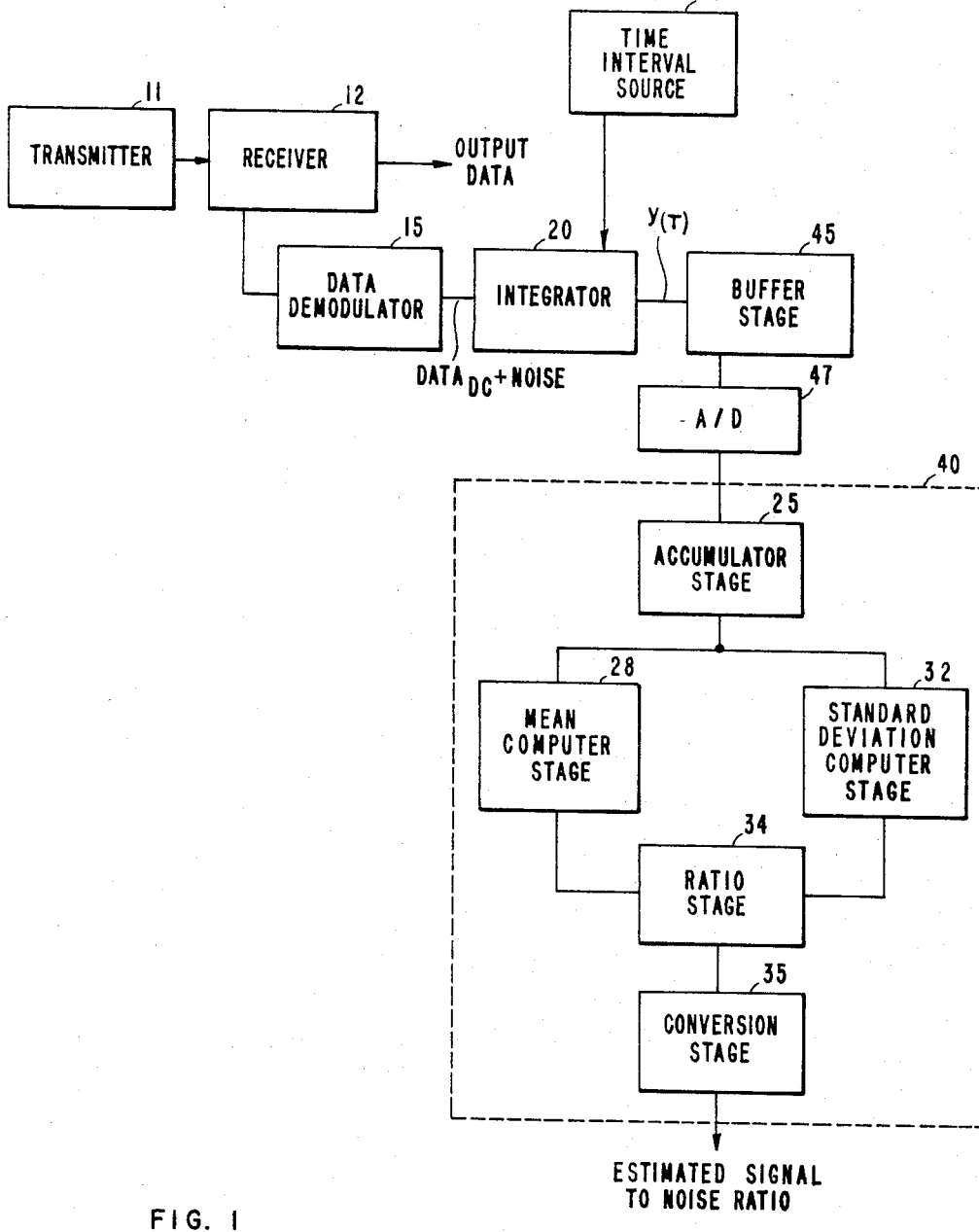
FIGURE 1 is a simplified block diagram of the present invention.

Attention is now directed to FIGURE 1 which is a simplified block diagram of a communication system including the signal-to-noise estimating system of the present invention. In the simplest form, the communication system may be considered as comprising a transmitter 11 which transmits data signals to a receiver 12. In the receiver, the data signals are operated upon to extract the data contained therein and provide output data for manual or automatic interpretation. It is appreciated by those familiar with the art that in nearly every communication system, some noise signals are produced by extraneous noise sources and that the number of such sources increases with the complexity of the system. Thus, the problem of accurately extracting the data from the signals received from the transmitter is complicated by the noise signals, hereafter also referred to simply as noise, which are superposed or combined with the data signals. As the noise increases due to system malfunctioning or the power or energy of the data signal decreases, the data signal-to-noise ratio decreases which increases the probability of erroneous interpretation of the transmitted data.

The effect of noise on the accuracy of interpreting the transmitted data is particularly significant in communication systems used in space exploration where the transmitter is in a space vehicle. Generally, the power of such a transmitter is quite low and since the distance between the vehicle and earth is often extremely great, the power of the data signals received by the receiver is extremely low. This, coupled with the fact that the receiver in a space communication system is actually a complex receiving system and therefore contains many potential sources of extraneous noise, accounts for the relatively low signal-to-noise ratios experienced in space communication systems.

However, in any given system operating under satisfactory conditions, the signal-to-noise ratio would be approximately constant. Any decrease in the ratio would indicate a degradation of the quality of the signals and could be attributed to an increase in noise due to system malfunctioning or a decrease in the received data signals which would indicate that the transmitter is not operating properly. Thus, by determining the signal-to-noise ratio, the performance of various portions or phases of the communication system can be determined. Such a capability is particularly significant in the complex space communication systems wherein data is continuously received from a space vehicle. By continuously determining the signal-to-noise ratio of the system and detecting any changes from known values, the performance of each phase of the system can be monitored to insure proper performance as well as take corrective measures as soon as any malfunction is discovered.

Referring again to FIGURE 1, there is shown the novel signal-to-noise estimating system of the present invention comprising a data demodulator 15 which receives the data signals received by the receiver 12 and any noise signals produced by all the extraneous noise sources in the system to provide an output, the instantaneous level of which is a function of the power of the received data signals plus the noise signals. The output is designated in FIGURE 1 as DATA$_{DC}$+NOISE. The output of demodulator 15 is supplied to an integrator 20 which is controlled by a time interval source 21 to integrate the output of demodulator during each of a succession of time intervals, each being of a period of T seconds. Thus, at the end of each interval, the output $y(T)$ of the integrator represents the DATA$_{DC}$+NOISE supplied thereto during a prior period T.

It is appreciated that in the absence of NOISE and if the power of the data signals received by the receiver 12 remains unchanged, the level DATA$_{DC}$ does not change. Therefore, at the end of each time interval $y(T)$ will be of equal amplitude. However, if either component of the input to the integrator 20 changes, the integrated output $y(T)$ changes. Defining the DATA$_{DC}$ input component as $\sqrt{S}$ volts and the NOISE component which is assumed to be flat gaussian noise $n(t)$ of spectral density $N/B$ watts/cycle per second, the input to the integrator 20 may be expressed as $$x(t) = \sqrt{S} + n(t) \quad (1)$$

When $x(t)$ is integrated for an interval T, the output or terminal value of the integral, $y(T)$ may be expressed as $$\int_0^T [\sqrt{S} + n(t)] dt$$

Thus by accurately controlling T, the integrator's output represents an accurately controlled noise bandwidth. This output is a random variable with a gaussian distribution, the mean parameter of which has been shown to equal $T\sqrt{S}$ and the variance parameter equaling ½ $TN/B$.

$$\text{mean } y(T) = T\sqrt{S} \quad (2)$$
$$\text{variance } y(T) = \tfrac{1}{2} TN/B \quad (3)$$

Since the variance of $y(T)$ equals the square of the standard deviation of $y(T)$, the ratio of mean to standard deviation of $y(T)$ may be expressed as $$\frac{\text{mean } y(T)}{\text{standard deviation } y(T)} = \sqrt{\frac{2TS}{N/B}} = \frac{\mu}{\sigma} \quad (4)$$

where $\mu$ and $\sigma$ represent the mean and the standard deviation respectively.

From the above relationship, it is thus seen that the ratio of data signals which are represented by the term $\sqrt{S}$ to the noise which is a function of $N/B$ is directly related to the mean of $y(T)$, divided by the standard deviation $y(T)$. The latter two parameters are observable quantities. They can be estimated by accumulating a sufficient number of time intervals. Thus, the output $y(T)$ of integrator 20 can be used to estimate signal-to-noise ratio of the communication system.

As seen from FIGURE 1, the output $y(T)$ of integrator 20 is supplied to an accumulator stage 25, through a buffer stage 45, the function of which will be described hereafter, and an analog-to-digital ($A/D$) converter 47 which converts the analog output of the integrator 20 into digital signals. The function of the accumulator stage is to accumulate $k$ samples of the output $y(T)$ at the ends of $k$ successive time intervals, the operation being expressed as $$\sum_{i=1}^{k} y_i(T)$$

Also the stage 25 is assumed to include a squaring circuit which squares each $y_i(T)$ signal and an additional accumulator to accumulate $k$ squares signals. The latter operation can be expressed as $$\sum_{i=1}^{k} [y_i(T)]^2$$

Thus, stage 25 is assumed to include at least two accumulators and a squaring circuit. The accumulator stage 25 is connected to a mean computer stage 28 and a standard deviation computer stage 32, the function of which is to estimate the mean of $y(T)$ and the standard deviation of $y(T)$ respectively from the accumulated samples.

As is appreciated by those familiar with the art, different estimators may be chosen to estimate the mean and standard deviation of a random variable such as $y(T)$. In the present invention, the basic criterion in choosing the estimators is to produce the best estimated mean and standard deviation with a minimum of samples and with a minimum of circuitry or accumulator storage capacity. On the basis of mathematical analysis, it has been found that the best estimate of the ratio of two estimated parameters $\hat{\mu}$ and $\hat{\sigma}$ where the $\wedge$ sign represents an estimated value may be derived by using the following estimators for $\hat{\mu}$ and $\hat{\sigma}$:

$$\hat{\mu} = \frac{1}{k} \sum_{i=1}^{k} y_i(T) \quad (5)$$

$$\hat{\sigma}^2 = \frac{1}{k-1} \sum_{i=1}^{k} [y_i(T) - \hat{\mu}]^2 \quad (6)$$

The latter estimator may also be expressed as $$\hat{\sigma}^2 = \frac{1}{k-1} \sum_{i=1}^{k} [y_i(T)]^2 - \frac{k}{k-1} \left[ \frac{1}{k} \sum_{i=1}^{k} y_i(T) \right]^2 \quad (7)$$

In the present invention, the accumulated value represented by $$\sum_{i=1}^{k} y_i(T)$$

is supplied from accumulator stage 25 to the mean computer stage 28, wherein the mean $\hat{\mu}$ is estimated in accordance with expression (5). Similarly, the two accumulated values represented by $$\sum_{i=1}^{k} y_i(T) \quad \text{and} \quad \sum_{i=1}^{k} [y_i(T)]^2$$

are supplied from accumulator stage 25 to standard deviation computer stage 32 where the standard deviation $\hat{\sigma}$ is estimated in accordance with expression (7). The outputs of the stages 28 and 32 are then supplied to a ratio stage 34 which divides the estimated mean by the estimated standard deviation to produce an estimated mean to standard deviation ratio $\hat{R}$, $$\hat{R} = \frac{\hat{\mu}}{\hat{\sigma}} \tag{8}$$

Recalling from expression (4) that the signal-to-noise ratio, $$\frac{ST}{N/B}$$

is directly related to $\mu/\sigma$, it becomes apparent that the output R is also directly related to the signal-to-noise ratio. In the present invention, the output $\hat{R}$ of stage 34 is supplied to a conversion stage 35 which produced an output of the estimated signal-to-noise ratio in desired units, such as db. Thus the output of stage 35 is the estimated signal-to-noise ratio of the communication system.

It should be appreciated that since the estimated ratio is derived by accumulating $k$ samples of $y(T)$, each sample being the output of integrator 20 produced after an integration period T, the estimated signal-to-noise ratio is only for the time period $T \times k$. In digital communication systems, T is generally a function of the signal bit rate. In one actual reduction to practice, an output within 0.3 db with 95% confidence interval was obtained, with $k$ being equal to 1,000. Increasing $k$ to 10,000 improved the output to within 0.1 db with a confidence interval of 95%. When the signals transmitted in the communication system are data signals, the output of the stage 35 may be expressed as $P_D/N$, where $P_D$ represents the power of the data signals and N represents NOISE, as previously defined.

The accumulator stage 25 and stages 28, 32, 34 and 35 may all be included in a special purpose computer 40 or in a computer of sufficient storage capacity which can be programmed to estimate the mean and standard deviation by performing the operations represented by expressions (5) and (7) on $k$ samples.

Since in presently known complex communication systems, computers are generally used for various purposes, the present invention may be conveniently incorporated without requiring a large amount of additional equipment. Since such computers are programmed to perform a great many computations unrelated to estimating the signal-to-noise ratio, when using such a computer to estimate the mean and the standard deviation, the present invention includes the buffer stage 45. The function of the stage is to accept each sample of $y(T)$ output of integrator 20 at the end of each T interval and hold it until the computer is ready to receive and accumulate the sample with the other $y(T)$ output samples. Thus, the estimating of the mean and standard deviation may be programmed into the computer as part of its overall program without unduly limiting the operation thereof.

From the foregoing description, it should be appreciated that the teachings of the present invention may be employed to detect the ratios of different signals, simultaneously transmitted by the communication system at different frequencies, so that more than one signal-to-noise ratio may be simultaneously derived. Such a capability is particularly significant in a space communication system, wherein different signals are transmitted in different channels, such as for example, carrier signals of a first frequency transmitted in a carrier channel and data signals transmitted in a subcarrier channel. The power ratio of data signals, hereafter designated as $S_D$, to carrier signals, hereafter designated $S_C$, is a function of the transmitter modulation index, which is generally maintained at a constant level. Under normal operating conditions, the power of the carrier signals received by the receiver is known. Signals are generally received from the transmitter in the space vehicle which indicate whether the power output of the transmitter is within satisfactory limits. Such information, together with the estimated ratio of carrier signals to noise and the estimated ratio of data signals to noise, could then be used to verify the operation of the communication system and sense and locate any malfunctioning therein. For example, by automatically estimating the carrier signals to noise ratio and the data signals to noise, the ratio of data signals to carrier signals can be derived, thereby providing a signal which is related to the modulation index. Thus, the noise in the system is used as a reference with which the modulation index may be monitored.

For a better understanding of the significance of the signal-to-noise estimating system of the present invention when used in conjunction with a multichannel communication system, such as a space communication system, reference is made to FIGURE 2. Therein, a receiver 50 is shown receiving signals from a space vehicle transmitter 55. For explanatory purposes, let us assume that the signals include carrier signals $S_C$ transmitted in a carrier channel at a first frequency or in a first frequency band when using fequency modulation techniques, and data signals $S_D$ transmitted in a subcarrier channel at a second frequency or frequency band. The received signals are combined with or superposed by noise signals N, which represent the noise signals produced by extraneous noise sources, within and external to the receiver 50. The latter circuit is shown including a receiving stage 56 which is connected to an integrator 60 through a carrier demodulation circuit 62. The function of circuit 62 is to demodulate the carrier signals $S_C$ and produce a voltage which is proportional to the received power $P_C$ of the carrier signals and the noise.

The receiving stage 56 is also connected to a subcarrier demodulation circuit 64, the function of which is to demodulate the data signals in the subcarrier channel from the carrier channel and supply the data signals $S_D$ to a phase detector 66 which produces a voltage output as a function of the power $P_D$ of the data signals and the noise. The output of phase detector 66 is supplied to an integrator 70 which, together with integrator 60, are controlled to integrate their respective inputs during each time interval T as herebefore described. Integrators 60 and 70 perform similar functions to that performed by intergrator 20 (FIGURE 1) as herebefore described. Namely, each integrator integrates the voltage supplied thereto during each time interval T. At the end of each intervals, the outputs of integrators 60 and 70 are stored as samples in buffer stages 80 and 90 respectively so that when a computer 100 which is operable in a manner similar to that of computer 40 (FIGURE 1), is ready to accumulate the samples in buffers 80 and 90, they are transferred thereto through respective analog-to-digital converters 82 and 92.

Representing the outputs of the integrators 60 and 70 as $C(T)$ and $D(T)$ respectively, the computer 100 accumulates $k$ samples of $C(T)$ and $k$ samples of $D(T)$ to produce an estimated mean and standard deviation for the $k$ $C(T)$ samples and the $k$ $D(T)$ samples. From the accumulated samples, the ratios of the carrier signals to noise and the data signals to noise are automatically derived. In FIGURE 2, $P_C/N$ represents the carrier signals to noise ratio, since $P_C$ is the received power of the carrier signals and N is noise. Similarly, $P_D/N$ represents the data signals to noise ratio, $P_D$ representing the received power of the data signals. The two ratio signals may then be supplied to a ratio producing circuit 105 to provide an output which may be expressed as $$\frac{P_D/N}{P_C/N} = \frac{P_D}{P_C}$$

The output is directly related to data signal power divided by the carrier signal power. Since the latter is a function of the modulation index, the output of circuit 105 may be used to continuously monitor the modulation index. It should be appreciated by those familiar with the art of communication that in accordance with the novel teachings of the present invention, the modulation index is monitored by using the noise in the system as a reference.

Irrespective however of the use of the circuit 105, the two outputs of the computer, representing the estimated ratios of the data and carrier signals to noise are most useful in continuously monitoring the performance of the communication system. The $P_D/N$ signal provides a data quality indication, while $P_C/N$ provides a carrier channel quality indication. Then $P_D/P_C$ is an indication of the modulation index on a real time basis. Thus, such signals can then be used to monitor the performance of the system on a real time basis and detect any signal degradation caused by system malfunctioning. It should be apparent that the several signal-to-noise ratios may be combined to produce performance parameters other than the modulation index, from which the actual performance of the system can be accurately evaluated. From the foregoing, it should further be apparent that in accordance with the teachings of the present invention, the relative values of signals such as $S_C$ and $S_D$ can be obtained without the need for careful calibration and measurement. Rather, by permitting noise with flat spectral density characteristics through the system, the noise is used as a reference from which the relative values of the signals are derived.

Reference is now made to FIGURE 3 which is a block diagram of an integrating and buffer circuit 110 which performs the function of one integrator and one buffer, such as integrator 70 and buffer 90 of FIGURE 2. As previously explained, the function of the integrator is to integrate the input voltage during each time interval T and the function of the buffer is to hold the integrated output until the computer is ready to accept the signal. Circuit 110 includes two integrators 115 and 120 and six switches 131 through 136 respectively. The outputs of the two integrators are connected to the A/D converter 92 through an absolute value circuit 140, the function of which is to supply an analog signal to converter 92 which is a function of only the magnitudes of the output of either integrator and is independent of the output polarity.

The switches 131 through 136 are controlled by a control circuit (not shown) so that during one time interval, switch 131 enables integrator 115 to integrate the DC voltage from detector 66. At the same time, switch 134 is disabled. Then at the end of the time interval (after T seconds), switch 134 is enabled to cause integrator 120 to integrate the DC voltage from detector 66 and switch 131 is disabled. At the same time, switch 132 is enabled so that the input of integrator 115 is connected to zero DC potential such as ground. Consequently, the output level thereof remains the same as it was at the end of the time interval. Then after the computer senses the output of integrator 115 through circuit 140 and A/D converter 92, switch 133 is enabled to quickly discharge integrator 115. Thus the two portions of circuit 110 operate in an alternate manner, so that each integrator integrates the voltage from detector 66 during alternate time intervals, and during a portion of a subsequent interval holds its output constant until the computer senses it to accumulate it with other output samples.

There has accordingly been shown and described herein a novel system for continuously monitoring signal-to-noise ratio in a communication system. In those systems wherein signals are transmitted in more than one channel, the ratio of the signals in each channel to noise can be estimated, with the several estimates being combinable to provide additional signals from which system performance such as the modulation index may be determined on a real time basis. It should be appreciated by those familiar with the art that modifications may be made in the arrangements as shown without departing from the spirit of the invention. For example, instead of using integrators to integrate the signals plus noise received during each interval T, the signals plus noise may be sampled at a predetermined rate, such as the Nyquist rate which is a function of the frequency of the signals. These samples could then be accumulated to provide a mean and standard deviation from which the signal-to-noise ratio may be estimated. Therefore, all such modifications and equivalents are deemed to fall within the scope of the invention as claimed in the appended claims.

What is claimed is:

1. In a communication system wherein information signals are transmitted from a transmitting source to a receiving system with noise signals being superposed on said information signals, an arrangement for estimating the ratio of said information signals to said noise signals comprising:
   means in said receiving system for receiving said information signals and noise signals superposed thereon;
   means for defining successive time intervals each having a duration T;
   means for integrating the information signals and the noise signals superposed thereon during each of said time intervals and providing an output at the end of said interval;
   means for accumulating $k$ outputs; and
   computing means responsive to said $k$ outputs including first means for providing a mean output, second means for providing a standard deviation output, third means for providing a mean to standard deviation output and output means for estimating the signal-to-noise ratio as a function of said mean to standard deviation output during the period $k \times T$ at which said $k$ outputs are accumulated.

2. In a communication system wherein data signals transmitted from a transmitting source to a receiver are combined with extraneous noise, a system for continuously monitoring the data signals with said noise to estimate the signal-to-noise ratio comprising:
   means for defining successive time intervals each having a duration T;
   means for integrating the received data signals combined with said extraneous noise during each of said time intervals and providing an integrated output at the end of said interval;
   means for accumulating the outputs provided at the ends of $k$ time intervals during a time period $k \times T$;
   means for estimating the mean value of said $k$ outputs;
   means for estimating the standard deviation of said $k$ outputs;
   means for providing a ratio output corresponding to the estimated mean divided by said estimated standard deviation of said $k$ outputs; and
   output means for deriving the ratio of said data signals to said noise received by said receiver during said time period $k \times T$ as a function of said ratio output.

3. In a communication system wherein signals of a predetermined frequency are transmitted in a communication channel of a transmitting source to a receiver wherein said signals are received, said signals being combined with noise signals produced by extraneous noise sources in said communication system, a system for estimating the ratio of said signals to said noise signals comprising:

means for defining successive time intervals each having a period T;

means for integrating the signals received during each time interval and the noise signals combined therewith to provide an output at the end of each T period;

means for accumulating $k$ outputs provided during a duration $k \times T$ and for providing a first signal representing the estimated means of said $k$ outputs and a second signal representing the estimated standard deviation of said $k$ outputs; and means responsive to said first and second signals for estimating the ratio of said signals to said noise signals.

4. In a communication system wherein signals are transmitted from a transmitter to a receiver, said signals being combined with noise produced by extraneous noise sources in said communication system, a system for estimating the ratio of said signals to said noise comprising:

means for receiving said signals and the noise combined therewith;

means for sampling said received signals and the noise combined therewith at a selected rate to provide sampled outputs;

means for accumulating a predetermined number of said sampled outputs;

means responsive to said predetermined number of said sampled outputs for providing a first signal representing the estimated mean of said predetermined number of sampled outputs and a second signal representing the estimated standard deviation of said sampled outputs; and output means responsive to said first and second signals for estimating the ratio of said signals to said noise.

5. In a communication system wherein signals of a first frequency are transmitted from a transmitting source in a carrier channel to a receiver and data signals of a second frequency are transmitted from said source in a subcarrier channel to said receiver, the ratio of the signal power in said subcarrier channel and said carrier channel being a function of the modulation index of said transmitting source, an estimating system for continuously monitoring the received carrier signals and the data signals to estimate the ratios of said carrier signals and said data signals to noise signals produced by extraneous noise sources in said communication system, the estimating system comprising:

first means for integrating the carrier signals received during each of a succession of $k$ time intervals and the noise signals produced during each of said $k$ time intervals to provide a first output at the end of each of said $k$ intervals;

second means for integrating the data signals received during each of said succession of $k$ time intervals and the noise signals produced during each of said $k$ time intervals to provide a second output at the end of each of said $k$ time intervals;

means for accumulating said $k$ first outputs to provide a carrier mean signal and a carrier standard deviation signal as a function of said $k$ first outputs, and for accumulating said $k$ second outputs to provide a data mean signal and a data standard deviation signal as a function of said $k$ second outputs; and output means for estimating the ratio of said carrier signals to said noise signals during a period equal to said $k$ time intervals as a function of said carrier mean and standard deviation signals and for estimating the ratio of said data signals to said noise signals during said period which is equal to said $k$ time intervals as a function of said data mean and standard deviation signals.

6. The estimating system defined in claim 5 wherein said carrier mean signal is related to $T\sqrt{S_c}$ where T is the period of each time interval and $\sqrt{S_c}$ is the carrier signal supplied to said first integrating means during each of said intervals, said carrier and data standard deviation signals being related to $\sqrt{1/2^{TN}/B}$, $N/B$ being the spectral density of said noise signals in watts per cycle per second, and said data mean signal is related to $T\sqrt{S_d}$, $\sqrt{S_d}$ being the data signal supplied to said second integrating means during each of said intervals, said ouput means including means for estimating the ratio of said carrier signals to said noise signals from the ratio of said carrier mean signal to said carrier standard deviation, and for estimating the ratio of said data signals to said noise signals from the ratio of said data mean signal to said data standard deviation signal.

7. The estimating system of claim 5 further including means for monitoring the modulation index of said communication system from the ratios of said carrier signals and said data signals to said noise signals.

8. In a communication system wherein first signals are transmitted in a first communication channel from a transmitter to a receiver and second signals are transmitted in a second communication channel from said transmitter to said receiver the power ratio of said first and second signals being related to the modulation index of said transmitter, an estimating system for continuously monitoring said first and second signals to estimate the ratios of said first and second signals to noise combined with said signal, the noise being produced by extraneous noise sources in said communication system, the estimating system comprising:

means for defining successive time intervals, each having a period T;

first means for integrating said first signals and the noise combined therewith, received by said receiver during $k$ successive time intervals to provide a first output at the end of each of said $k$ intervals;

second means for integrating said second signals and noise combined therewith received by said receiver during said $k$ successive time intervals to provide a second output at the end of each of said $k$ intervals;

means for accumulating said $k$ first outputs to provide a first mean signal and a first standard deviation signal and for accumulating said $k$ second output to provide a second mean signal and a second standard deviation signal; and output means for estimating the ratio of said first signals to said noise as a function of said first mean and standard deviation signals and for estimating the ratio of said second signals to said noise as a function of said second mean and standard deviation signals.

9. The estimating system of claim 8 further including means responsive to the ratios of said first and second signals to said noise for deriving an output signal which is a function of said first and second signals.

10. The estimating system of claim 9 wherein said means responsive to the ratios of said first and second signals to said noise derive said output signals which is related to the modulation index of said transmitter.

11. In a communication system wherein first signals are transmitted in a first communication channel from a transmitter to a receiver and second signals are transmitted in a second communication channel from said transmitter to said receiver the power ratio of said first and second signals being related to the modulation index of said transmitter, an estimating system for continuously monitoring said first and second signals to estimate the ratios of said first and second signals to noise combined with said signal, the noise being produced by extraneous noise sources in said communication system, the estimating system comprising:

first means for sampling the first signals and the noise second means for sampling the second signals and the noise combined therewith to provide second output samples, the rates of sampling said first and second signals being related to their respective frequencies;

means for accumulating said $k$ first output samples to provide a first mean signal and a first standard deviation signal and for accumulating said $k$ second output samples to provide a second mean signal and a second standard deviation signal; and output means for estimating the ratio of said first signals to said noise as a function of said first mean and standard deviation signals and for estimating the ratio of said second signals to said noise as a function of said second mean and standard deviation signals.

12. The estimating system of claim 11 further including means responsive to the ratios of said first and second signals to said noise for deriving an output signal which is a function of said first and second signals.

13. The estimating system of claim 12 wherein said means responsive to the ratios of said first and second signals to said noise derive said output signals which is related to the modulation index of said transmitter.

References Cited

UNITED STATES PATENTS

| | | | |
|---|---|---|---|
| 3,182,181 | 5/1965 | Schumann | 235—150.51 X |
| 3,290,592 | 12/1966 | Pharo et al. | 324—77 |
| 3,302,116 | 1/1967 | Free | 325—363 |

ROBERT L. GRIFFIN, *Primary Examiner.*

B. V. SAFOUREK, *Assistant Examiner.*